United States Patent [19]

Janz et al.

[11] 4,223,940
[45] Sep. 23, 1980

[54] GLOVE COMPARTMENT LID FOR VEHICLES, OR THE LIKE

[75] Inventors: Joachim Janz; Manfred Schneider, both of Wuppertal, Fed. Rep. of Germany

[73] Assignee: Gebr. Happich GmbH, Fed. Rep. of Germany

[21] Appl. No.: 909,451

[22] Filed: May 25, 1978

[30] Foreign Application Priority Data

Jun. 18, 1977 [DE] Fed. Rep. of Germany ....... 2727394

[51] Int. Cl.² .............................................. B60R 7/06
[52] U.S. Cl. .................................. 296/37.12; 49/394; 292/53; 292/127; 292/DIG. 37
[58] Field of Search .......................... 296/37.12, 31 P; 180/90; 49/394; 292/127, 53, DIG. 37; 220/215, 210, 4 B, 469

[56] References Cited

U.S. PATENT DOCUMENTS

| | | | |
|---|---|---|---|
| 2,313,711 | 3/1943 | Jacobi | 292/DIG. 37 |
| 2,789,861 | 4/1957 | Hudson | 296/37.12 |
| 3,040,832 | 6/1962 | Wilfert | 296/37.12 |
| 3,503,648 | 3/1970 | James | 296/37.12 |

Primary Examiner—Robert R. Song
Attorney, Agent, or Firm—Ostrolenk, Faber, Gerb & Soffen

[57] ABSTRACT

A lid for a glove compartment of a vehicle, or the like, comprised of an upper and a lower injection molded lid half, which halves are secured together, a lock for the glove compartment lid, including a swiveling lock bar, which is held to the lid, and a cam carrying tumbler which is moved to position cams for swivel opening the lock bar when the tumbler is pushed in, the lid halves are shaped with various recesses, holes and shapings for being supported in relative positions and for receiving and holding the lock.

20 Claims, 7 Drawing Figures

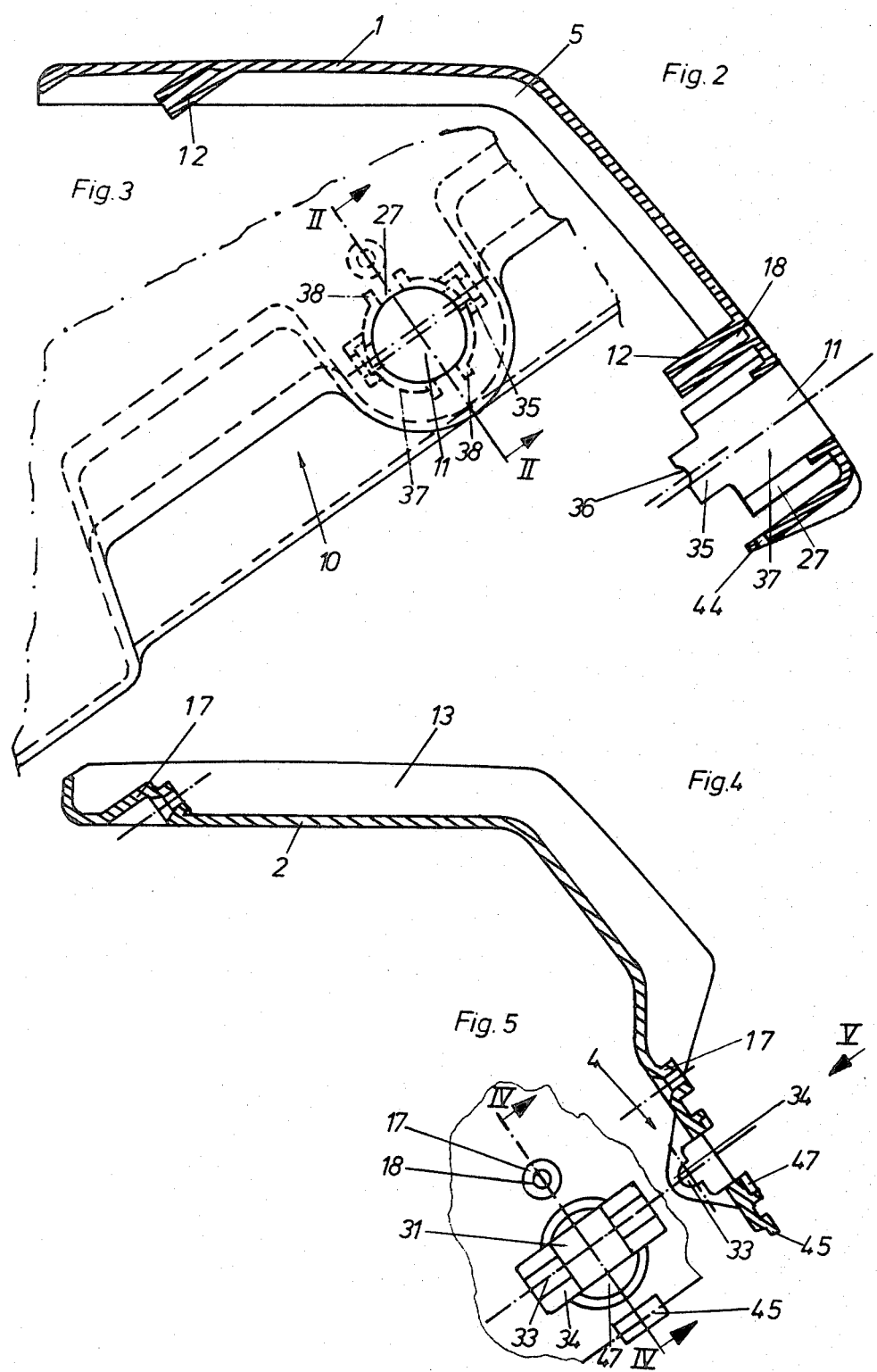

GLOVE COMPARTMENT LID FOR VEHICLES, OR THE LIKE

BACKGROUND OF THE INVENTION

The invention relates to a lid, and in particular to a glove compartment lid for motor vehicles. The lid has hinges on one long edge and is equipped with a closing device in the area of the other long edge.

It is known to design glove compartment lids for motor vehicles as single piece plastic injection moldings. But thus far the only usable closing device for such a lid is a complete lock, the manufacture and assembly of which is very expensive. It is also known to design a glove compartment lid, half of which consists of sheet metal and the other half of which consists of foamed plastic. Such a lid is heavy and its production is costly. Here again, the only usable closing device is a complete lock. A complete lock is also required in the case of another known glove compartment lid, half of which consists of plastic foam and the other half of which consists of a plastic injection molding. This latter known glove compartment lid has the additional disadvantage of an inaccurate fit which impairs its appearance.

One problem with using a complete lock is that it is expensive and thereby increases the cost of the glove compartment. In addition, complete locks must be machined by a profile turning, milling, etc. That machining is not only expensive but is also subject to error because of the close tolerances involved.

SUMMARY OF THE INVENTION

It is a primary object of the invention to create a lid, in particular a glove compartment lid, which can be manufactured simply and inexpensively, whose closing device consists of only a few simple components and which is easily assembled and functions reliably.

It is another object of the invention to provide such a lid comprised of two halves each designed as plastic injection moldings and each having molded-on means for closing and locking the two lid halves.

It is a further object of the invention to provide such a lid having a closing device which is an integral part of the lid halves, thereby eliminating the need for providing a complete lock.

It is a still further object of the invention to provide such a lid, wherein the closing device comprises a spring-loaded locking bar molded on one lid half and a spring-loaded pushbutton molded on the other lid half.

According to the invention, a lid for a glove compartment, or the like, is comprised of two lid halves, each of which is a plastic injection molding and each of which has a molded-on bearing seat for a closing device. The closing device is attached to the lid halves and comprises a spring-loaded locking bar and a spring-loaded pushbutton movable toward the locking bar. The bearing seat molded to the one lid half, e.g. the upper one, may comprise a nipple with diametrically opposed, longitudinal slots terminating at the free end of the nipple. The one lid half has an opening aligned with a nipple opening for the head end of the pushbutton to pass through. The outside surface of the pushbutton insertable into the free end of the nipple may have diametrically opposed molded-on cams which engage the longitudinal nipple slots. This fixes the pushbutton axially in one direction and also secures it against rotation.

The bearing seat provided in the other lid half, e.g. the lower half, is preferably comprised of two small bearing blocks which project outwardly from the plane of the lid. Each of the small bearing blocks has a respective semi-circular, concave groove in mutual alignment so as to receive two outwardly oriented bearing shaft journals attached to the locking bar. The small bearing blocks are provided with an opening for the locking bar to pass through and to support itself in the concave grooves of the blocks by means of two outwardly oriented bearing shaft journals. Two webs extend concentrically with the nipple but are longer than it and are molded to the one lid half for the purpose of retaining the bearing shaft journals from the opposite sides. The free ends of the webs have a semi-circular concave recess for the accommodation of the bearing shaft journals of the locking bar. As a result of this design, the locking bar is fixed on the one end but is also pivotally mounted on the other.

In another embodiment of the invention the pushbutton is provided with a shoulder at its free end facing the locking bar. The shoulder is in the form of an inwardly oriented step. A helical spring is supported against one end of the step or shoulder while the other end is received by a bearing pad on the other or lower lid half. It is desirable that the locking bar have a central recess with two mutually opposed cams in co-axial alignment with the bearing shaft journals to accommodate a spring, one leg of which is supported in a recess widening of the locking bar while the other spring leg engages the outside of the lower lid half. Those particular design features make possible a simple plug-in and telescoping assembly of the closing device. The final unity of the closed device is thereby assured once the lid halves are joined together.

The lid halves are preferably joined by screws. This can be facilitated by providing one lid half with tongue-shaped tabs on one of the longer sides and the other lid half with cutouts to fit the tabs. The lid halves also have mutually abutting bearing pads at each screw connection. The lid halves then need only be nested in each other, snapped and then screwed together in the centered position.

To facilitate the handling of the glove compartment lid, it is expedient to provide the lid halves with molded-in gripping recesses on their long front edge.

In its simplest embodiment, the closing device comprises merely the spring-loaded pushbutton which engages the locking bar directly so that the locking bar can be pivoted out of the locking position, countering the spring force acting upon the locking bar, as soon as the pushbutton is being pushed.

In an improved embodiment, the closing device is lockable. The pushbutton comprises a two-part design, namely a key-operated tumbler and a housing in which it is rotatably mounted. The tumbler supports, at its end facing the locking bar, a cam molded on eccentrically. The locking bar will not pivot out of its locking position unless, when the pushbutton is pushed, the tumbler cam assumes a predetermined position set by the key for this purpose. The housing in which the tumbler is mounted is preferably made of plastic and has diagonally opposed cams molded to its outside surface. Furthermore, the housing has spring action tabs on one end which engage an annular groove in the tumbler.

Thus, the invention provides a locking device which functions like a complete lock but which uses no more than the tumbler element normally found in a complete lock. As a result, the closing device of this invention, even when it is lockable, is considerably less expensive to manufacture than a complete lock. This has an obvious impact in terms of the overall cost of the glove compartment or other item using the lid permitting the efficient manufacture of a glove compartment or other item at a reduced expense but having substantially the same optimum performance as conventional lidded glove compartments or other items with closing devices.

Modified features of the invention include the following, for example. The other or lower lid half may be offset relative to the one or upper lid half by being made slightly smaller, whereby tolerances caused by possible heat expansion of the vehicle dashboard are compensated for without having to provide visible gaps for such a purpose. Furthermore, it is possible to provide the outside surface of the upper lid half and the encircling head with a grained appearance. Graining a rim is not only decorative but entails the advantage of displaying no visible gaps when the lid halves are not joined together precisely.

BRIEF DESCRIPTION OF THE DRAWINGS

Other objects and features of the invention will be apparent from the following description and accompanying drawings in which:

FIG. 2 is a side cross sectional view of the upper lid half of the glove compartment along the line II—II in FIG. 3.

FIG. 3 is a top view of a fragment of the upper lid half shown in FIG. 2.

FIG. 4 is a side cross sectional view of one embodiment of the lower lid half along the line IV—IV of FIG. 5.

FIG. 5 is a top view of a fragment of the lower lid half in FIG. 4, in the direction of the arrow V in FIG. 4.

DESCRIPTION OF THE PREFERRED EMBODIMENT

Figure 1:
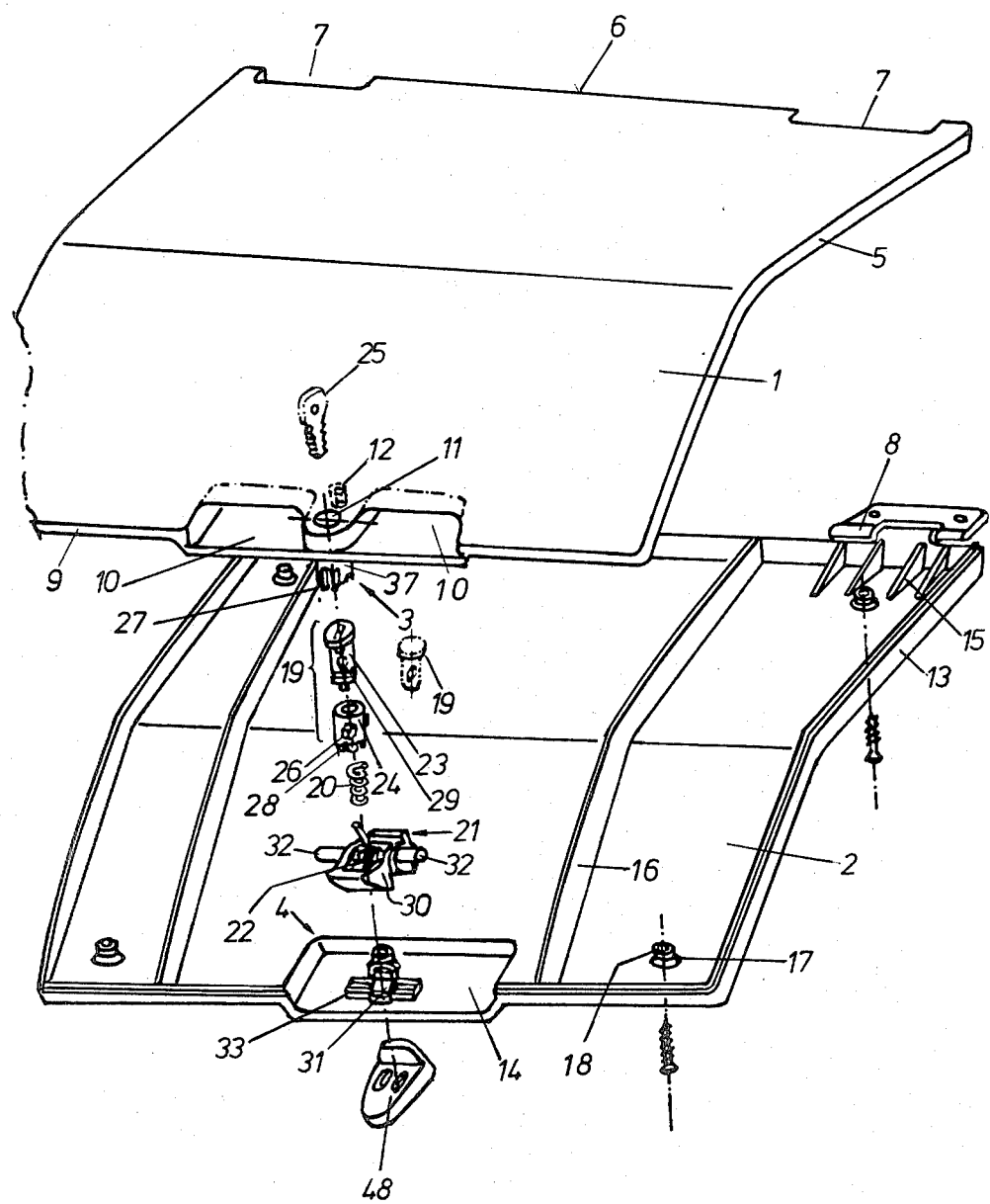
FIG. 1 is an exploded view, in perspective, of a glove compartment lid according to the invention.

As shown in FIG. 1, the glove compartment lid comprises an upper lid half 1, a lower lid half 2, and a closing device as described in detail hereinafter. Both lid halves 1, 2 are plastic injection moldings and each has a respective integrally molded-in bearing seat 3 and 4. The upper lid half 1 has an encircling, downwardly folded rim 5, which has two spaced apart recesses 7 on its long rear edge 6. The recesses 7 are engaged by hinges 8 that are molded to the lower lid half 2. In the center area of its long front edge 9, the upper lid half 1 has two gripping recesses 10. Located between the gripping recesses 10 is a through hole 11 which continues into the bearing seat 3. The upper lid half 1 has bearing pads 12 in various places along its side facing toward the lower lid half 2 for maintaining the desired spacing and relative orientation of the lid halves.

The length and width dimensions of the lower lid half 2 are slightly smaller than those of the upper lid half 1. The lower lid half 2 is provided with an encircling, upwardly extending rim 13 that is slightly covered by rim 5. A depression 14 on the lower lid half accommodates the lower wall area of the gripping recesses 10. In the area of the hinges 8 the rim 13 is reinforced by reinforcing webs 15. The entire lower lid half 2 is reinforced by traversely extending ribs 16. Bearing pads 17, each having a through hole 18 therein are arranged so as to be exactly opposite some of the bearing pads 12 on the upper lid half.

The closing device comprises a pushbutton 19, a helical spring 20, a locking bar 21, and a torsion spring 22. The pushbutton 19 may be of one-part design, as shown offset and in dash-dotted lines in FIG. 1, or it may be of a two-part design as shown in bold lines. In the latter case the pushbutton 19 comprises a tumbler cylinder 23 rotatably accommodated in a housing 24 and operable by a key 25. The outside surface of the pushbutton 19 or of the housing 24 has molded-on, outwardly oriented cams 26, which engage the longitudinal slots 27 of the bearing seat 3. The tumbler 23 is received inside the bore through the housing 24. Springy tabs 28 for snapping into an annular groove 29 in the tumbler 23 inside the housing 24 are molded to the lower edge of the housing 24.

Figure 6:
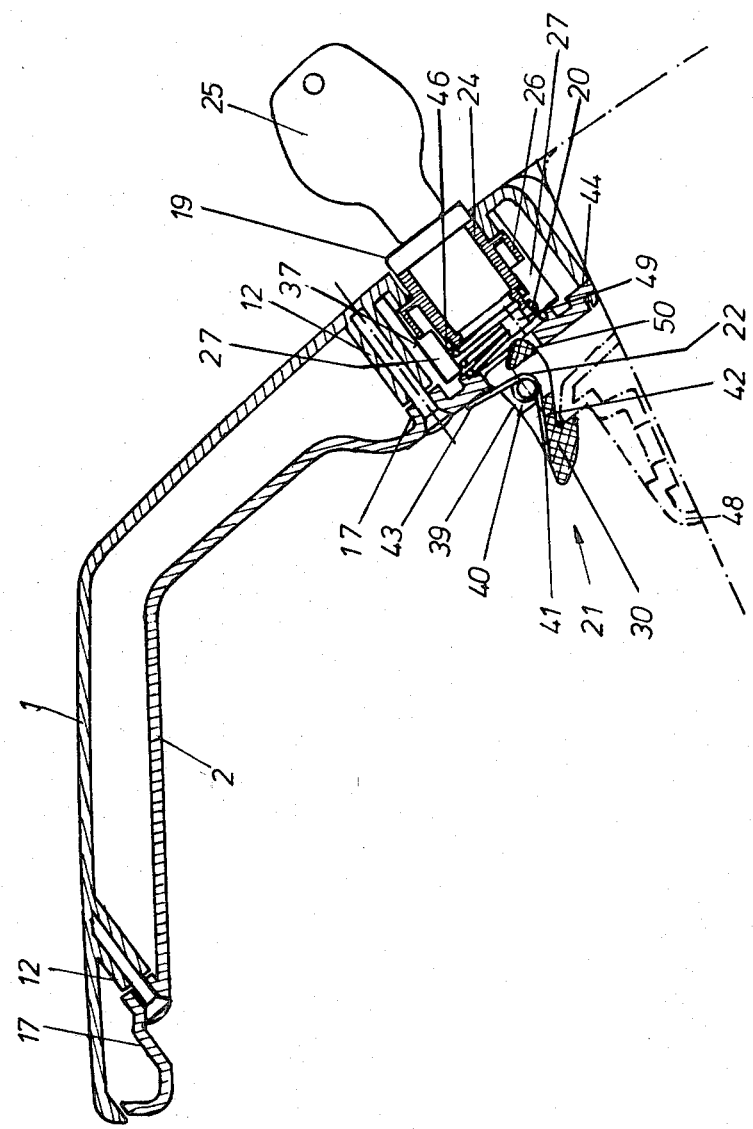
FIG. 6 is a side cross sectional view of the complete glove compartment lid when the lid has been closed.
Figure 7:
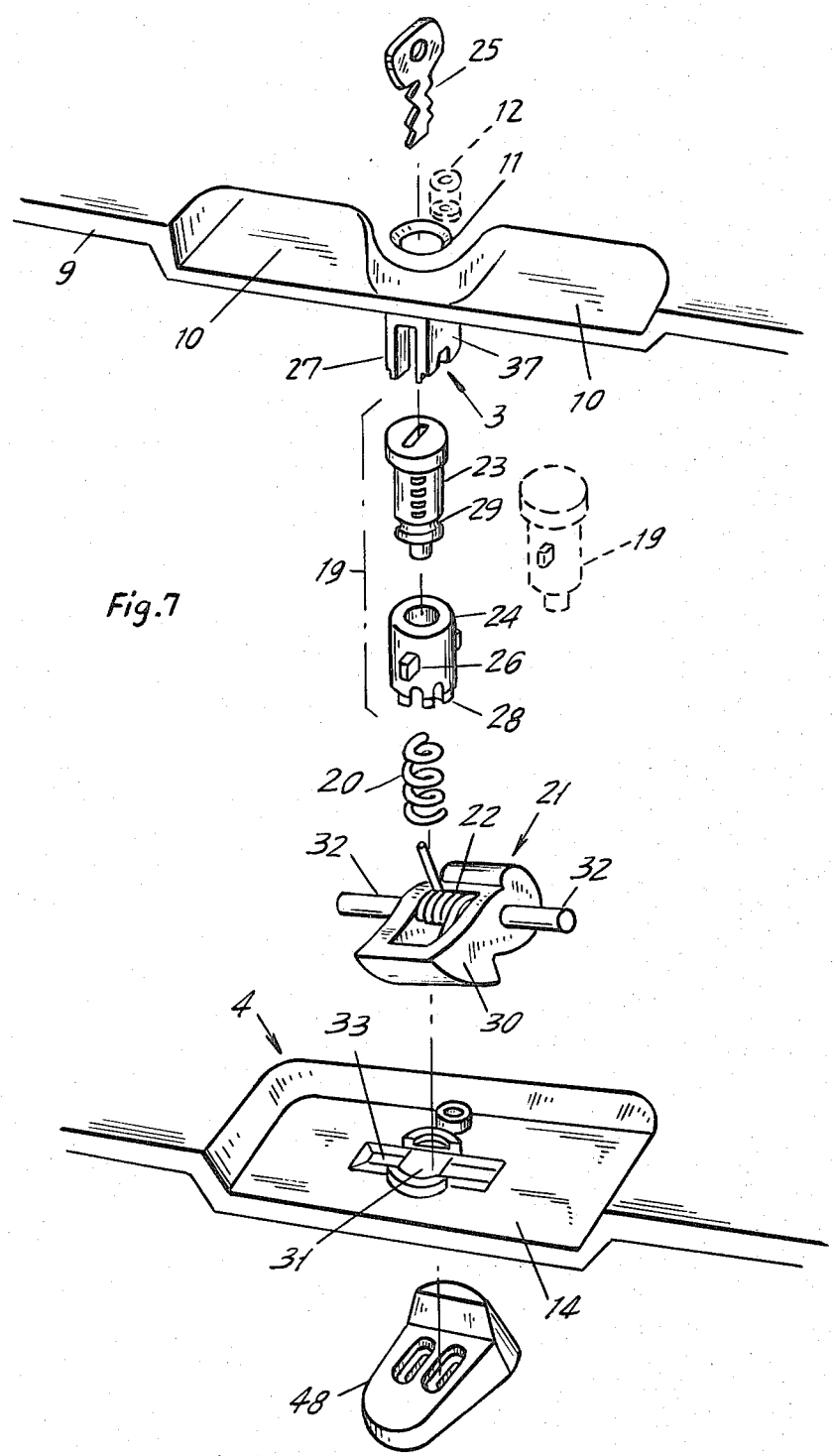
FIG. 7 is an enlarged view of a fragment of the glove compartment lid of FIG. 1.

The locking bar 21 has a hook 30 which penetrates through a hole 31 in the area of the bearing seat 4. There is a hook engaging part 48 on the body of the glove compartment, which the hook 30 is adapted to snap over, as shown in FIG. 6, and on which the hook 30 is spring-biased. The hook 30 has two outwardly oriented bearing shaft journals 32. The shaft journals are mounted in semi-circular concave grooves 33 of the small bearing blocks 34 (shown in FIGS. 4 and 5) on the lower lid half and are also supported by webs 35, each having at its free end a semi-circularly shaped concave recess 36 on the upper lid half. The bearing seat 3 has a nipple 37 depending downwardly therefrom and the nipple contains the longitudinal slots 27. As FIG. 2 shows, the longitudinal slots 27 terminate at a distance from the underside of the upper lid half 1 and are extended by material pads 38.

Referring to FIG. 6, the locking bar 21 has a central cutout section 39 with two mutually opposite cams 40, which are in coaxial alignment with the bearing shaft journals 32 to accommodate the torsion spring 22. In assembled condition, one spring leg 41 lies in a recess extension 42 of the hook 30 while the other spring leg 43 presses against the outside of the lower lid half. The tabs 45 on the lower lid half are insertable in the cut-outs 44 in the upper lid half 1. This holds the lid halves permanently together.

The hook 30, which is pivotable about its pivot journal 32, has a projecting stop cam 50 atop it, which is placed to intercept the actuating cam 49 that is attached to the cylinder 23 and that is rotated with the housing by key 25. Rotation of the key 25 eventually swivels the cam 49 above the cam 50, i.e. the position shown in FIG. 6. Then key 25 may selectively be removed. Thereafter, depression of button 19 pushes cams 49 and 50 together and pivots hook 30 off retaining part 48, enabling opening of the lid.

FIG. 6 shows the glove compartment lid in the assembled condition and also shows how the closing device functions. For assembly of the lockable embodiment, the housing 24 is first pushed over the tumbler cylinder 23 until the springy tabs 28 snap into the annular groove 29 on the tumbler cylinder 23. Thereupon the key 25 securing the tumblers is pulled out and the complete pushbutton 19 including tumbler cylinder 23 and housing 24, is inserted in the nipple 37 until the cams 26 are located at the ends of the longitudinal slots. The torsion spring 22 is assembled to the locking bar 21 and the hook of the bar 21 is then introduced into the hole 31. Now, before the lid halves 1,2, are nested in each other, with the tabs 45 in the cutouts 44, the helical spring 20 is inserted. One end of the spring is supported against a stepwise receding shoulder 46 of housing 24 while the other end is supported by a bearing pad 47 on the lower lid half. The hook 30 of the locking bar 21 can be pivoted away from the retaining part 48 on the body of the glove compartment when, after appropriate roation of the key 25, the actuating cam 49 of the tumbler 23 strikes the stop cam 50 of the locking bar 21 due to the actuation of the pushbutton 19.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A lid for a glove compartment, or the like, comprising:
   a first and a second plastic material lid half; said lid halves having spaced apart edges; hinge means on one said edge for enabling said lid to be hingedly attached to another object; at another said edge, both said lid halves being provided with respective bearing seats for receiving a closing device;
   that said closing device being at said bearing seats; said closing device comprising:
      a locking bar located between said lid halves and supported on said second lid half bearing seat; said locking bar including an engaging element for extending out of said second lid half toward the other object to which said lid is hingedly attached; biasing means for biasing said locking bar engaging element to engage the other object;
      pushbutton means supported on said first lid half bearing seat and operable to engage said locking bar and for urging said locking bar contrary to the bias of said locking bar biasing means; pushbutton means biasing means for biasing said pushbutton means away from engaging said locking bar.

2. The lid of claim 1, wherein said pushbutton biasing means comprises a compression spring between said pushbutton means and said second lid half.

3. The lid of claim 1, wherein said locking bar is supported by said second lid half bearing seat which supports said locking bar on said lid halves for swiveling between the positions of said locking bar;
   said locking bar biasing means comprising a torsion spring having one leg in biasing engagement with said engaging element and having a second leg in biasing engagement with one said lid half.

4. The lid of claim 1, wherein said lid halves have, on the same respective said edges thereof, and away from said hinge means, molded-in gripping recesses.

5. The lid of claim 1, wherein said bearing seat of said first lid half comprises an annular nipple projecting toward said second lid half; said nipple having a free end away from said first lid half;
   said first lid half further having an opening therein aligned with said nipple for enabling said pushbutton means to extend therethrough.

6. The lid of claim 5, wherein said nipple has longitudinally extending slots defined therein terminating at said nipple free end; said slots being for receiving cams on said pushbutton means;
   said pushbutton means having an outside surface having cams attached thereon and said cams being placed so as to be received in said nipple slots; said pushbutton means being inserted in said nipple with said cams thereof in said slots, for retaining said pushbutton means both longitudinally, against the normal bias of said pushbutton biasing means, and rotationally.

7. The lid of claim 6, wherein said slots and said cams are on diametrically opposite sides of said nipple and pushbutton means, respectively.

8. The lid of claim 6, wherein said pushbutton biasing means comprises a compression spring between said pushbutton means and said second lid half; said compression spring urging said cams into said slot.

9. The lid of claim 5, wherein said closing device comprises locking means for making said closing device lockable.

10. The lid of any of claims 1, 5 or 9, wherein said lid halves are dimensioned such that some respective said edges thereof are slightly offset and one said lid half being smaller than the other said lid half.

11. The lid of claim 9, wherein said locking means comprises said pushbutton means comprising a key operable rotatable tumbler and a housing for containing said tumbler and for permitting rotation thereof by a key;
   said tumbler having an end facing toward said locking bar; a cam on that said tumbler end for being rotated by said tumbler into engagement with said locking bar for moving said locking bar with said engaging element against the bias of said locking bar biasing means.

12. The lid of claim 11 further comprising means for retaining said tumbler in said housing while permitting said tumbler to rotate with respect to said housing.

13. The lid of claim 11, wherein said retaining means comprises said housing including tongue means therein which are spring-biased toward said tumbler, and said tumbler including groove means for being engaged by said tongue means, thereby to retain said tumbler in said housing.

14. The lid of claim 13, wherein said bearing seat of said first lid half comprises an annular nipple projecting toward said second lid half; said nipple having a free end away from said first lid half;
   said first lid half further having an opening therein aligned with said nipple for enabling said pushbutton means to extend therethrough;
   said housing having an outside surface with cams attached thereon and said cams being so placed as to be received in said slots in said nipple;
   said pushbutton means being inserted in said nipple with said housing cams in said slots retaining said pushbutton means both longitudinally against the normal bias of said pushbutton biasing means and rotationally.

15. The lid of claim 1, wherein said lid halves are secured together; bearing points extending from at least one said lid half toward the other said lid half for abutting as said lid halves are secured.

16. The lid of either of claims 1 or 15, wherein said lid halves are secured together through one said lid half having a tab thereon in tongue form near an edge of that said lid half and the other said lid half having a cutout therein for receiving said half.

17. The lid of claim 15, wherein said lid halves are secured by being screwed together and said bearing points are defined at said screw connections.

18. The lid of any of claims 3, 5 or 15, wherein said second lid half bearing seat includes bearing blocks on said second lid half and which are grooved for receiving said locking bar for enabling said locking bar to swivel under the influence of said locking bar biasing means and said pushbutton means; an opening through said second lid half through which said engaging element of said locking bar extends.

19. The lid of claim 18, wherein said locking bar includes bearing shaft journals; said bearing block grooves being placed to receive said bearing shaft journals.

20. The lid of claim 19, wherein said first lid half includes webs with recesses formed therein and said webs and said recesses therein being placed and shaped for receiving said bearing shaft journals as said bearing shaft journals are held in said blocks.

* * * * *